United States Patent
Baxter, Jr.

[11] Patent Number: 5,954,612
[45] Date of Patent: Sep. 21, 1999

[54] MULTI-SPEED OFFSET TRANSFER CASE

[75] Inventor: Ralph W. Baxter, Jr., Fort Wayne, Ind.

[73] Assignee: Dana Corporation, Toledo, Ohio

[21] Appl. No.: 08/912,632

[22] Filed: Aug. 18, 1997

[51] Int. Cl.[6] .................................................. F16H 37/08
[52] U.S. Cl. ...................... 475/198; 475/204; 475/210; 180/247
[58] Field of Search ...................................... 475/198, 200, 475/201, 204, 205, 209, 210, 213, 248; 180/247, 248

[56] References Cited

U.S. PATENT DOCUMENTS

| | | | |
|---|---|---|---|
| 1,670,596 | 5/1928 | Sheldon . | |
| 1,805,819 | 5/1931 | Goeser . | |
| 1,810,975 | 6/1931 | Martois . | |
| 3,505,904 | 4/1970 | Williams, Jr. | 74/665 |
| 3,583,242 | 6/1971 | Thornbloom et al. | 74/15.2 |
| 3,884,097 | 5/1975 | Avramidis et al. | 475/213 X |
| 4,719,814 | 1/1988 | Ida et al. | 180/247 X |
| 4,876,919 | 10/1989 | Nagano et al. | 180/247 X |
| 5,045,036 | 9/1991 | Reuter et al. | 475/149 |
| 5,046,998 | 9/1991 | Frost | 180/247 X |
| 5,320,586 | 6/1994 | Baxter, Jr. | 475/88 |
| 5,344,105 | 9/1994 | Wang | 474/69 |
| 5,443,429 | 8/1995 | Baxter, Jr. | 475/204 |
| 5,704,866 | 1/1998 | Pritchard et al. | 475/248 X |
| 5,833,566 | 11/1998 | Showalter | 475/198 |
| 5,853,342 | 12/1998 | Pritchard et al. | 475/198 |

*Primary Examiner*—Dirk Wright
*Assistant Examiner*—Peter T. Kwon
*Attorney, Agent, or Firm*—Oldham & Oldham Co., L.P.A.

[57] ABSTRACT

A multi-speed offset transfer case for a four (4) wheel drive motor vehicle having a plural stage torque transfer and speed changing mechanism which provides four (4) or more output speeds for each input speed. A modified planetary gear assembly forms the first stage and provides selectively either speed reduction or an output speed which is equal to the input speed. This planetary gear assembly receives torque from an input shaft and includes a sun gear in driven engagement with the input shaft, a planetary gear carrier which supports a plurality of planet gears and a ring gear. The planetary gear carrier includes an output sleeve, which is preferably an integral part of the planetary gear carrier. An actuator for the planetary gear assembly includes a first shift collar which is capable of grounding the ring gear so that it will not rotate, thereby causing the planetary gear carrier to be driven at a lower angular speed than the input shaft, and a second shift collar which locks the planetary gear carrier to the ring gear so that both rotate at the same angular speed as the input shaft. The second stage includes two (2) or more chain drives which are engaged alternately, providing two (2) or more output speeds for each input speed. This makes it possible to obtain four (4) or more output speeds ranging from a deep reduction to overdrive.

20 Claims, 1 Drawing Sheet

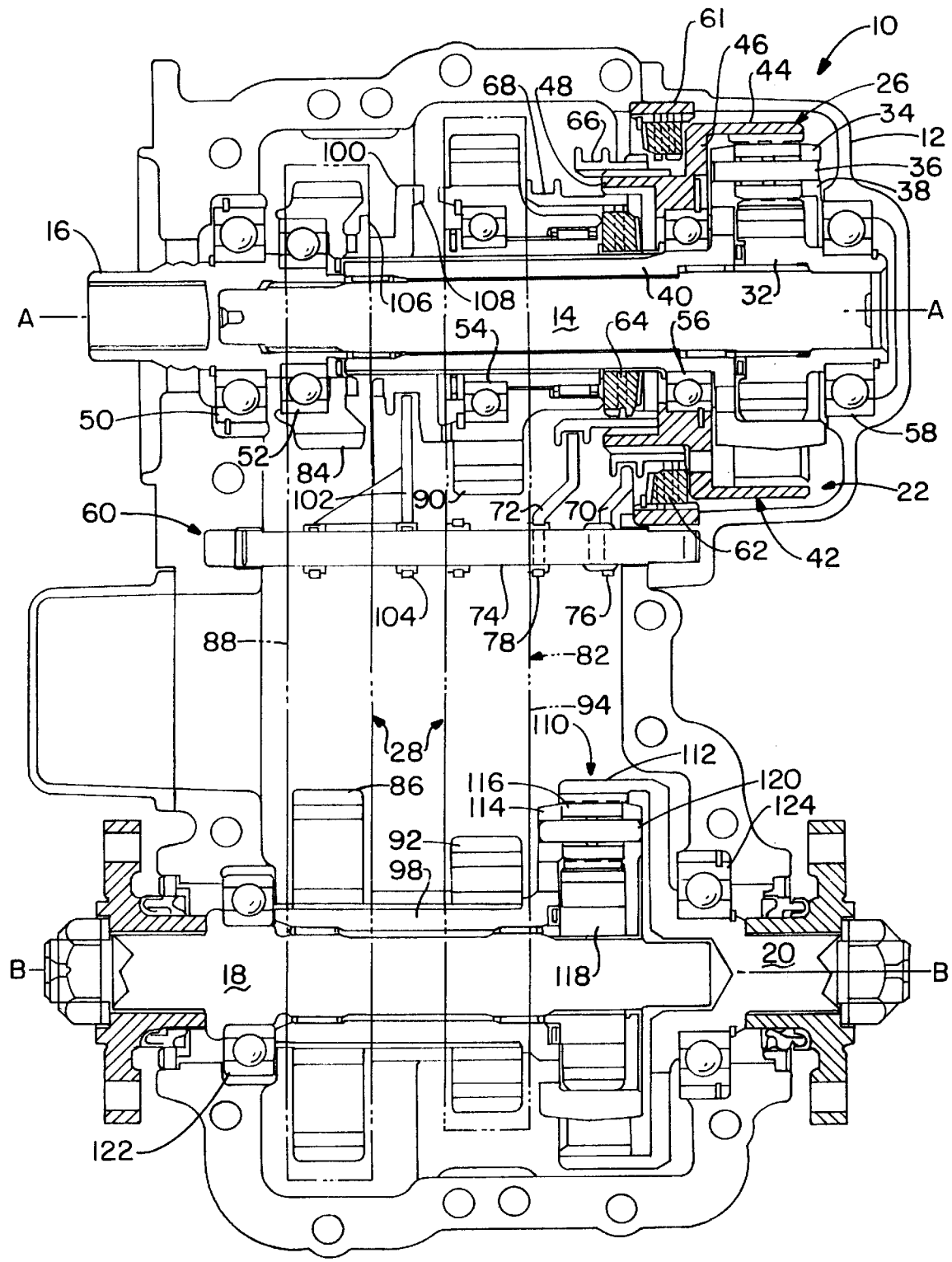

MULTI-SPEED OFFSET TRANSFER CASE

BACKGROUND OF THE INVENTION

1. Field of the Invention

This invention relates to transfer cases for automotive vehicles having either full-time or part-time four-wheel drive.

2. Description of the Prior Art

Four-wheel drive vehicles, including trucks, sports utility models, and other vehicles which are suitable for rough terrain or off-road use are well known. A vehicle which is operated on rough terrain or off-road conditions may encounter situations in which one (1) axle has poor traction (say due to mud) while the other axle has good traction. Four-wheel drive vehicles are also advantageous on paved roads where traction on the two (2) axles may be uneven due to snow, ice or rain. Four-wheel drive vehicles may have either full-time or part-time four-wheel drive. Four-wheel drive is highly desirable in vehicles which are subjected to frequent adverse driving conditions, such as off-road use, roads on which pavement is in bad condition, or on wet, snowy or icy pavements. These considerations are all well known in the art.

Four-wheel drive vehicles (both full-time and part-time) having two (2) driving speeds (or output speeds) afforded by a transfer case are well known. However, presently known transfer cases afford only two (2) output speeds. Lacking is a transfer case which affords more than two (2) output speeds.

SUMMARY OF THE INVENTION

It is an object of this invention to provide a transfer case which affords at least four (4) output speeds.

A particular object of this invention is to provide a transfer case which affords a plurality of output speeds ranging from high reduction to overdrive.

This invention comprises a multi-speed offset transfer case comprising a housing having an interior and an exterior, an input shaft mounted in the housing for rotation about a first axis, and rotatable first and second output shafts extending from the interior to the exterior of the housing. This invention further provides a plural stage torque transfer and speed changing mechanism which in turn comprises a first stage torque transfer and speed changing mechanism for transferring torque from the input shaft to an intermediate driven member and providing at least two (2) output speeds for each input speed, and at least one (1) subsequent stage including a final stage torque transfer and speed changing mechanism for transferring torque from a rotatable intermediate driven member to at least one (1) output shaft and providing at least two (2) output speeds for each input speed. This invention also comprises a speed selector mechanism enabling a user to select individually for each stage of the torque transfer and speed changing mechanism one of the at least two (2) output speeds provided by a stage.

A preferred transfer case according to this invention is a multi-speed offset transfer case affording four (4) or more output speeds, in which the output shafts are coaxial and are offset from the input shaft. The preferred transfer case is a two-stage device, the first stage providing two (2) output speeds and the second stage providing two (2) or more output speeds.

This invention provides a transfer case which provides four (4) or more output speeds ranging from deep reduction to overdrive, thereby offering the driver a variety of speed ranges. This enables a driver to select from at least four (4) output speeds or speed ranges the speed or range which is most appropriate for driving conditions. For example, on rough terrain the driver may select the deepest reduction, while on a smooth, paved road the driver may select the highest or overdrive range.

BRIEF DESCRIPTION OF THE DRAWINGS

The sole FIGURE of drawing is a vertical sectional view, taken along a longitudinal center line of a vehicle, of a transfer case in accordance with this invention.

DETAILED DESCRIPTION

This invention will now be described in detail with reference to preferred embodiments thereof, and with particular reference to the best mode and preferred embodiment thereof.

The term "speed", when used herein without a modifier, refers to rotational or angular speed. The term "linear speed" will be used whenever linear speed is meant.

The term "speed ratio" as used herein denotes the ratio of an input speed to an output speed.

The preferred transfer case herein is for a four-wheel drive vehicle having four (4) full-time driven wheels, i.e., two (2) front wheels and two (2) rear wheels, and for a six-wheel drive vehicle having four (4) full-time driven wheels, i.e., the two (2) wheels on each of two (2) rear axles being driven.

Referring now to the sole figure of the drawing, 10 is a multi-speed offset transfer case which is stationary relative to the vehicle in which it is installed. Multi-speed offset transfer case 10 is typically on a longitudinal center line of the vehicle and receives power from a drive shaft, which in turn receives power from a vehicle transmission, which may be either manual ("stick shift") or automatic, and which may be conventional in either case.

Multi-speed offset transfer case 10 includes hollow housing 12 having an interior and an exterior.

Input shaft 14 is rotatably mounted inside hollow housing 12 for rotation about first axis A, which extends longitudinally along the center line of the vehicle. Input shaft 14 is adapted to be driven by a drive shaft (not shown) which extends rearwardly longitudinally from a vehicle transmission (also not shown), which in turn receives power from a vehicle engine (also not shown). Input shaft 14 is adapted to be driven at the same speed as the drive shaft through sleeve connector or coupling 16. Sleeve connector or coupling 16 may be internally splined to engage external splines formed on a posterior end of the drive shaft and an anterior end of input shaft 14.

A pair of output shafts 18 and 20 are rotatably mounted within hollow housing 12. Output shafts 18 and 20 are coaxial and their common axis B is laterally offset from the axis of input shaft 14. Output shafts 18 and 20 include first or front output shaft 18 which extends from multi-speed offset transfer case 10 forwardly to the front end of a vehicle and second or rear output shaft 20 which extends rearwardly toward the rear of a vehicle. Front output shaft 18 drives front wheels and rear output shaft 20 drive rear wheels by means which are known in the art.

Between input shaft 14 and output shafts 18 and 20 is a plural stage speed changing mechanism denoted generally as 22. Plural stage speed changing mechanism 22 is housed inside hollow housing 12 and includes first stage torque transfer mechanism 26 and second (and in this case final)

stage torque transfer mechanism 28. First stage torque transfer mechanism 26 transfers torque from input shaft 14 to an intermediate driven member at either of two (2) (or more) output speeds which may be selected by the driver. Similarly, final stage torque transfer mechanism 28 transfers torque from the intermediate driven member to at least one (1) of output shafts 18 and 20 and provides at least two (2) output speeds for each input speed (which in this case is the speed of the intermediate driven member). Multi-speed offset transfer case 10 of this invention provides at least four (4) output speeds (i.e., the speed of output shafts 18 and 20) for each input speed (the speed of input shaft 14). (The total number of output speeds, or speed ratios, obtainable in transfer case 10 of this invention, is the product of the number of output speeds or speed ratios in each stage.) The output speeds may range from deep reduction to overdrive, as will be hereinafter explained.

The preferred first stage torque transfer and speed changing mechanism 26 is a first planetary gear assembly, as shown in the drawings.

Input shaft 14 delivers torque to first planetary gear assembly 26, which is capable of delivering output torque at either of two (2) pre-selected speed (or gear) ratios. First planetary gear assembly 26 is coaxial with input shaft 14 and includes first planetary sun gear 32, which is externally toothed and internally splined for rotation with input shaft 14, and a plurality of first planetary planet gears 34 which engage sun gear 32. First planetary planet gears 34 are rotatably mounted on pins 36 of first planetary gear carrier 38. First planetary gear carrier 38 also includes sleeve 40 which extends toward the anterior end of input shaft 14 and which surrounds a major portion of input shaft 14. First planetary gear carrier 38 and input shaft 14 are mounted so first planetary gear carrier 38 can rotate independently of input shaft 14.

Sleeve 40 is an integral part of first planetary gear carrier 38 and therefore rotates with first planetary gear carrier 38. Sleeve 40 is a driven rotatable intermediate member which serves both as output sleeve for first stage torque transfer and speed changing mechanism (i.e., first planetary gear assembly) 26 and as the input member for second stage torque transfer and speed changing mechanism 28.

First planetary gear assembly 26 further includes internally toothed ring gear 42. Internally toothed ring gear 42 includes internally toothed outer ring 44 which is supported on radially extending annular support member (e.g., a plate or a spider) 46. Internally toothed ring gear 42 further includes collar 48 which is of smaller diameter than internally toothed outer ring 44 and which is splined on both its internal surface and its external surface for engagement of shift collars as will be hereinafter described. Internally toothed outer ring 44 and collar 48 extend axially in opposite directions from support member 46.

Sleeve connector or coupling 16, input shaft 14 and first planetary gear assembly 26 are rotatably mounted inside hollow housing 12 by a plurality of bearing assemblies, 50, 52, 54, 56 and 58. First and second bearing assemblies 50 and 52, respectively, engage sleeve connector or coupling 16 in free-wheeling rotatable engagement. Third and fourth bearing assemblies 54 and 56, respectively, engage sleeve 40 of first planetary gear carrier 38 in free-wheeling rotatable engagement. Fifth bearing assembly 58 rotatably engages sun gear 32 in free-wheeling rotatable engagement. The bearing assemblies also serve to support input shaft 14 in rotatable fashion, by supporting annular members 16 and 32 which surround portions of input shaft 14.

Multi-speed offset transfer case 10 of this invention further includes speed selector mechanism 60 for selecting an output speed individually for each stage 26 and 28 of the torque transfer and speed changing mechanism. Speed selector mechanism 60 includes a first stage actuator mechanism for controlling first planetary gear assembly 26. This first stage actuator mechanism provides for selectively grounding internally toothed ring gear 42 so that it will not rotate, or locking first planetary gear carrier 38 so first planetary gear carrier 38 and internally toothed ring gear 42 will co-rotate at the same speed. In this manner, two (2) different output speeds (or gear ratios) are obtained. When internally toothed ring gear 42 is grounded, first planetary gear carrier 38 will rotate at a slower speed than that of input shaft 14, affording gear reduction. This is suitable when a vehicle is pulling a heavy load. When internally toothed ring gear 42 and first planetary gear carrier 38 are locked so that they rotate at the same speed, first planetary gear carrier 38 will also rotate at the same speed as that of input shaft 14. This is useful in high-speed, on-highway operation.

The mechanism for selectively grounding internally toothed ring gear 42 or locking first planetary gear carrier 38 to internally toothed ring gear 42 includes fixed ring 61 which is fixably mounted in a recess in an inner surface of hollow housing 12, a first friction plate and a first spline plate, making first clutch assembly 62, a second friction plate and a second spline plate, making second clutch assembly 64, and first and second axially movable shift collars 66 and 68, respectively, for activating first planetary gear assembly 26. First axially movable shift collar 66 is a grounding shift collar and second axially movable shift collar 68 is a locking shift collar.

First and second clutch assemblies 62 and 64 may be of any known type. First clutch assembly 62 includes a first set of annular plates splined along outer circumferential surfaces to fixed ring 61 and a second set of annular plates splined along inner circumferential surfaces for selectively engaging grounding (or first) axially movable shift collar 66. The first and second sets of plates are interleaved in alternating sequence, and are compressed together so that all are stationary.

Similarly, second clutch assembly 64 includes a first set of annular plates which are splined along outer circumferential surfaces so as to rotate with first planetary gear carrier 38 and specifically sleeve 40 thereof, and a second set of plates which are splined along inner circumferential surfaces so as to selectively engage annular locking (or second) axially movable shift collar 68. The first and second sets of plates are interleaved in alternating sequence and are compressed together so that all rotate as a unit.

First or grounding axially movable shift collar 66 has splines on both its internal and external circumferential surfaces. The former engage splines on collar 48 of internally toothed ring gear 42 at all times. The external splines engage splines on first clutch assembly 62 when first axially movable shift collar 66 is to the right, as seen below the axis of input shaft 14, but are out of engagement with the thrust bearings splines when first axially movable shift collar 66 is to the left, as seen above the axis of input shaft 14. Similarly, second or locking axially movable shift collar 68 has splines on both its internal and external circumferential surfaces. The internal splines engage splines on collar 48 of internally toothed ring gear 42 at all times. External splines on shift collar 68 engage inner splines of second clutch assembly 64 when second axially movable shift collar 68 is to the left, as seen above the axis of input shaft 14, but are out of engagement when second axially movable shift collar 68 is to the right, as seen below the axis of input shaft 14. Thus, both first and second axially movable shift collars 66 and 68 rotate with internally toothed ring gear 42 and are stationary when internally toothed ring gear 42 is stationary.

When first or grounding axially movable shift collar 66 is to the left, as shown above the axis of input shaft 14, the outwardly directed splines of first axially movable shift collar 66 are out of engagement with the inwardly directed splines of first clutch assembly 62, so internally toothed ring gear 42 is flee to rotate. When first or grounding axially movable shift collar 66 is moved to the right, as seen below the axis of input shaft 14, the outwardly directed splines of first axially movable shift collar 66 engage the inwardly directed splines of first clutch assembly 62 which is stationary. Since the internal splines of first axially movable shift collar 66 simultaneously engage outwardly directed splines on collar 48 of internally toothed ring gear 42, internally toothed ring gear 42 is grounded in a stationary position.

When second or locking axially movable shift collar 68 is to the left as shown above the axis of input shaft 14, the inwardly directed splines on second or locking axially movable shift collar 68 engage splines on collar 48 of internally toothed ring gear 42 and simultaneously the inwardly directed splines on second axially movable shift collar 68 engage outwardly directed splines on second clutch assembly 64 which is also splined to sleeve 40 for rotation therewith. In this position of second axially movable shift collar 68, first planetary gear carrier 38 (of which sleeve 40 is a part) and internally toothed ring gear 42 rotate together at the same speed as that of input shaft 14. When second or locking axially movable shift collar 68 is to the right, as shown below the axis of input shaft 14, first planetary gear carrier 38 is free to rotate independently of internally toothed ring gear 42, so first planetary gear carrier 38 can rotate while internally toothed ring gear 42 is grounded.

The actuator system for actuating first and second axially movable shift collars 66 and 68 is arranged (as will be described subsequently in greater detail), so both first and second axially movable shift collars 66 and 68 are to the left as seen above the axis of input shaft 14, or are both to the right as seen below the axis of input shaft 14. If first or grounding axially movable shift collar 66 were to the right so as to engage first clutch assembly 62 and second or locking axially movable shift collar 68 were to the left so as to engage second clutch assembly 64 simultaneously, the entire multi-speed offset transfer case 10 would be locked and would be prevented from rotation.

For low speed operation, grounding (or first) axially movable shift collar 66 and locking (or second) axially movable shift collar 68 are both to the right, as shown below the axis of input shaft 14 in the drawing, so internally toothed ring gear 42 is prevented from rotating and first planetary gear carrier 38 is free to rotate. In this mode of operation, first planetary planet gears 34 will precess around sun gear 32, and first planetary gear carrier 38 will rotate at a lower speed than that of input shaft 14, giving a speed reduction.

When grounding (or first) axially movable shift collar 66 and locking (or second) axially movable shift collar 68 are to the left as shown above the axis of input shaft 14 in the drawing, internally toothed ring gear 42 is free to rotate and first planetary gear carrier 38 and internally toothed ring gear 42 are locked together so they rotate at the same speed. In this mode of operation, first planetary gear carrier 38 has an angular speed which is the same as that of input shaft 14, so that no speed reduction is obtained from first planetary gear assembly 26.

First and second axially movable shift collars 66 and 68 are controlled by respective shift levers 70 and 72, which in turn are controlled by rotatable and axially moveable actuator shaft 74, which is rotatably mounted in hollow housing 12 on an axis which is parallel to that of input shaft 14. Rotatable and axially movable actuator shaft 74 has a plurality of cams thereon, including cams 76 and 78 which engage shift levers 70 and 72, respectively, in one position of rotatable and axially movable actuator shaft 74 and do not engage shift levers 70 and 72 in other positions of rotatable and axially movable actuator shaft 74. A first shift mechanism includes first axially movable shift collar 66 and its associated shift lever 70. Similarly, a second shift mechanism includes second axially movable shift collar 68 and its associated shift lever 72.

Second stage torque transfer and speed changing mechanism 28 includes first and second drive means, here shown as a pair of chain drive assemblies 80 and 82, for driving output shafts 18 and 20. Chain drive assemblies 80 and 82 are structurally similar, but afford different speed ratios. First chain drive assembly 80 includes small rotatable drive sprocket 84 which is coaxial with input shaft 14, large rotatable driven sprocket 86 which is coaxial with first output shaft 18, and chain 88 connecting small rotatable drive sprocket 84 to large rotatable driven sprocket 86 so large rotatable driven sprocket 86 is in driven relationship with small rotatable drive sprocket 84. The terms "small" and "large" referring to the sprockets are relative and denote that large rotatable driven sprocket 86 has a larger diameter than small rotatable drive sprocket 84. This first chain drive assembly 80 affords a speed reduction. Second chain drive assembly 82 includes a large rotatable drive sprocket 90 coaxial with input shaft 14, small rotatable driven sprocket 92 coaxial with first output shaft 18, and chain 94 connecting large rotatable drive sprocket 90 and small rotatable driven sprocket 92 so small rotatable driven sprocket 92 is in driven relationship with large rotatable drive sprocket 90. Again, the terms "small" and "large" are used in a relative sense to denote that small rotatable driven sprocket 92 has a smaller diameter than large rotatable drive sprocket 90, so the output speed is greater than the input speed. This provides overdrive. Both rotatable drive sprockets 84 and 90 are mounted on sleeve 40 of first planetary gear carrier 38 for rotation therewith (e.g., through splines). Similarly, both rotatable driven sprockets 86 and 92 are mounted on driven output sleeve 98 for rotation therewith (e.g., with splines). Driven output sleeve 98 is concentric with output shaft 18 and surrounds a portion of output shaft 18. Torque is transferred from driven output sleeve 98 to output shafts 18 and 20 through a differential, as will be hereinafter described.

Speed selector mechanism 60 further includes a second stage actuator mechanism which enables a driver or user to select an output speed for second stage torque transfer and speed changing mechanism 28. More particularly, speed selector mechanism 60 enables a driver to selectively place either first (lower speed) chain drive assembly 80 or second (higher speed or overdrive) chain drive assembly 82 in driven engagement with sleeve 40. The output speed of first stage 26 and the output speed of second stage 28 can be selected independently of each other. This second stage actuator mechanism also includes axially reciprocal third shift collar or fork 100 and shift lever 102 which is adapted to be engaged by cam 104 mounted on rotatable and axially movable actuator shaft 74. Axially reciprocal third shift collar or fork 100 selectively places either first chain drive assembly 80 or second chain drive assembly 82 in driving engagement with intermediate sleeve 40 and driven output sleeve 98. Axially reciprocal third shift collar or fork 100 has two (2) axially displaced clutch members 106 and 108, which engage respective clutch members on small rotatable drive sprocket 84 and large rotatable drive sprocket 90. When axially reciprocal third shift collar or fork 100 is moved to the left, as shown above the axis of input shaft 14, small rotatable drive sprocket 84 is engaged for low speed operation. Similarly, when axially reciprocal third shift collar or fork 100 is to the right, as shown below the axis of input shaft 14, large rotatable drive sprocket 90 is engaged for overdrive or higher speed operation.

First and second output shafts 18 and 20, respectively, are coupled by second planetary gear assembly 110, which acts as a differential, permitting first and second output shafts 18 and 20, respectively, to rotate at different speeds. Second planetary gear assembly 110 includes second planetary ring gear 112, which is coaxial with and rotatable with second output shaft 20 and preferably (as shown) integrally joined thereto, second planetary gear carrier 114 which is coaxial with first output shaft 18 and rotatable relative thereto, a plurality of planet gears 116 mounted on second planetary gear carrier 114 and meshing with second planetary ring gear 112, and second sun gear 118 which is coaxial with and rotatable with first output shaft 18. Second planetary gear carrier 114 includes a plurality of pins 120 on which planet gears 116 are rotatably mounted. Axially extending driven output sleeve 98 previously described is integral with second planetary gear carrier 114. Output shafts 18 and 20 may be rotatably supported in hollow housing 12 by bearing assemblies 122 and 124.

The apparatus shown in the drawing provides four (4) different overall speed ratios (or "axle ratios"), ranging from overdrive to a deep reduction ratio, and therefore four (4) different output speeds (i.e., speed of output shaft 18) corresponding to a single input speed (i.e., speed of input shaft 14).

For purposes of illustration, it will be assumed that the first planetary gear assembly provides selectively either a 2.7:1 speed reduction or a 1:1 speed ratio, and that first chain drive assembly 80 provides a 1.37:1 speed reduction, and that second chain drive assembly 82 provides a 0.73:1 speed ratio (i.e., overdrive). With these speed ratios, the following overall speed ratios are obtainable: 0.73:1 (overdrive), 1.37:1, 1.97:1 and 3.7:1 reduction ratios. The speed ratio is the ratio of input speed (rotational speed of input shaft 14) to output speed (speed of output shaft 18). It will be apparent that the speed ratios specified in this paragraph are illustrative and can be varied as desired, although these ratios represent a preferred embodiment. It will also be apparent that more than four (4) speed ratios are obtainable by providing more than two (2) chain drive assemblies.

The deepest speed reduction, or lowest gear, is obtained by "grounding" first planetary internally toothed ring gear 42 and by using first or low speed chain drive assembly 80 including small rotatable drive sprocket 84, large rotatable driven sprocket 86 and chain 88. When first axially movable shift collar 66 is moved to the right as seen below axis A of input shaft 14 in the sole figure of drawings, internally toothed ring gear 42 is "grounded" or held stationary and power is transmitted from input shaft 14 through sun gear 32 (which rotates at the same speed as input shaft 14) and first planetary planet gears 34 to first planetary gear carrier 38, causing first planetary gear carrier 38 to rotate at a lower angular speed than that of input shaft 14. First chain drive assembly 80 provides a further gear reduction. Using the illustrative values previously given, a 2.7:1 speed reduction is achieved in first planetary gear assembly 26 and a further 1.37:1 speed reduction is achieved in first chain drive assembly 80, giving an overall speed reduction ratio of 3.7:1. This speed reduction ratio is specially suitable for the most adverse of driving conditions, e.g., driving on rough terrain or pulling a heavy load on a steep upgrade.

A somewhat smaller overall speed reduction ratio may be obtained by grounding first internally toothed ring gear 42, as described above, but using second chain drive assembly 82, which affords an overdrive connection, between sleeve 40 of first planetary gear carrier 38 and driven output sleeve 98 of second planetary gear carrier 114. By appropriate placement of the respective cams on rotatable and axially movable actuator shaft 74, it is possible to select this combination, since the position of axially reciprocal third shift collar or fork 100 may be made independent of the position of either first axially movable shift collar 66 and second axially movable shift collar 68. Using the illustrative numerical values given above, an overall speed reduction ratio of 1:1.97, the second reduction ratio, may be used under conditions somewhat less adverse, e.g., on graded but unpaved roads, on paved roads where the vehicle is not heavily loaded or where the vehicle is heavily loaded, but there are no steep upgrades.

The third reduction ratio, 1.37:1 in the illustrative embodiment, is achieved by moving first and second axially movable shift collars 66 and 68, respectively, to the left as shown above the axis of input shaft 14, so that first internally toothed ring gear 42 is free to rotate, but first planetary gear carrier 38 is locked to first internally toothed ring gear 42 so that these two elements rotate at the same speed, and by selecting first or lower speed range chain drive assembly 80.

Finally, overdrive, or an overall speed ratio of 0.73:1, may be obtained by positioning first and second axially movable shift collars 66 and 68 to the left as shown above the axis of input shaft 14 (same as the third speed reduction ratio), and by using second chain drive assembly 82, which affords overdrive. When either the third or the fourth speed ratio is used, first planetary gear carrier 38 rotates at the same speed as that of input shaft 14. Appropriate selection of the desired first chain drive assembly 80 or second change drive assembly 82 affords either a slight gear reduction (1.37:1 in illustrative embodiment) or overdrive (0.73:1 in the illustrative embodiment). Overdrive is particularly useful under the most favorable of driving conditions, e.g., paved road, light to moderate load and no steep upgrades.

The shift mechanisms herein described are capable of being shifted while a vehicle is in motion, so that one can go from one gear ratio to another as driving conditions change, e.g., as a vehicle goes from a level road or a downgrade to an upgrade.

It will be appreciated that each of the speed ratios herein described is actually a driving range afforded by multi-speed offset transfer case 10. In addition to the speed ratios provided by the transfer case, a conventional automotive vehicle transmission, whether manual gear shift or automatic, affords a range of speeds (in this case the speed of a drive shaft and of input shaft 14 relative to engine speed). It will thus be appreciated that a wide variety of speeds, suitable for every driving condition, is afforded by multi-speed offset transfer case 10 of the present invention when used in conjunction with the either a manual or an automatic transmission of known type.

Various modifications can be made within the scope of this invention. First, as has already been pointed out, it is possible to have more than four (4) speed ratios simply by providing more than two (2) chain drive mechanisms. Thus, either six (6) or eight (8) speed ratios are obtainable. It will be apparent that the total number of speed ratios obtainable is the product of the number of chain drive mechanisms times two (2) (the number of speed ratios obtainable through first planetary gear assembly 26).

It is also possible to provide more than two (2) stages of torque transfer and speed changing mechanism instead of the two (2) stages 26 and 28 shown. This is not usually necessary or desirable, since the presence of more than two (2) stages increases multi-speed offset complexity of multi-speed offset transfer case 10, and it is possible to obtain a broad range of speed ratios with two (2) stages, simply by providing more than two (2) chain drive mechanisms in the second stage if desired.

It is also possible to replace first chain drive assembly 80 and second chain drive assembly 82 with gear drive assemblies having intermeshing gears (say an output gear which meshes directly with an input gear) if desired.

Instead of the arrangement shown, where the two (2) output shafts 18 and 20 (which may be front and rear output shafts, respectively) are coaxial and the common axis of the two (2) output shafts is parallel to the axis of input shaft 14, it is possible to provide output shafts which are coaxial but whose axis is disposed at a small angle to the axis of the input shaft. Another possible arrangement would be to have output shafts whose axes intersect, but are at a small or at a large obtuse angle relative to each other, (rather than at a straight or 180° angle relative to each other) and which are offset from the axis of the input shaft. It is possible, if desired, to provide a transfer case in which one output shaft (say the rear output shaft) has an axis which is coaxial with that of the input shaft while the axis of the other (say the front output shaft) is parallel to the axis of the input shaft.

The speed selector (or shift) mechanisms for actuating first and second axially movable shift collars 66 and 68, respectively, must be arranged so that first planetary gear assembly 26 is not locked to internally toothed ring gear 42 while internally toothed ring gear 42 is "grounded" (held in a stationary position) when the vehicle is in motion. If a parking brake is desired, the actuators for first and second axially movable shift collars 66 and 68 may be arranged to permit simultaneous grounding of internally toothed ring gear 42 and locking of first planetary gear carrier 38 to internally toothed ring gear 42.

The apparatus disclosed is intended for full-time four-wheel drive vehicles. Where either two-wheel drive or pair-time four-wheel drive is desired, it is possible to eliminate the second planetary gear assembly and to mount the driven sprockets directly on the full-time driven output shaft (say 18), e.g., using splines so that the driven sprocket and the output shaft will rotate at the same speed. A suitable mechanism (e.g., clutch mechanism) known in the art may be used to selectively engage or disengage the output shaft which is driven part-time.

Other modifications will be apparent to those skilled in the art.

While this invention has been described in detail with particular reference to the preferred embodiment, it will be recognized that other variations can be made without departing from the scope and spirit of the invention.

What is claimed is:

1. A multi-speed transfer case providing at least four (4) output speeds for a given input speed, said multi-speed transfer case comprising:

a housing having an interior and an exterior;
   an input shaft mounted in said housing for rotation about a first axis;
   rotatable first and second output shafts;
   a plural stage torque transfer and speed changing mechanism including, in series, a first stage torque transfer and speed changing mechanism for receiving torque from said input shaft and providing at least two (2) output speeds for each input speed and at least one (1) subsequent stage torque transfer and speed changing mechanism for receiving torque from a preceding stage and providing at least two (2) output speeds for each input speed, said at least one (1) subsequent stage torque transfer and speed changing mechanism including a final stage torque transfer and speed changing mechanism for transferring an output torque to at least one (1) of said output shafts; and
   a speed selector mechanism for selecting individually for each stage of said torque transfer and speed changing mechanism one (1) output speed provided by that stage.

2. The multi-speed transfer case in accordance with claim 1, wherein said final stage is a second stage.

3. The multi-speed transfer case in accordance with claim 2, further including a rotatable intermediate driven member which serves as an output member for said first stage and an input member for said second stage.

4. The multi-speed transfer case in accordance with claim 3, wherein said rotatable intermediate driven member is a sleeve coaxial with said input shaft.

5. The multi-speed transfer case in accordance with claim 2, wherein said first and second output shafts are coaxial, having a common axis which is parallel to and offset from the axis of said input shaft.

6. The multi-speed transfer case in accordance with claim 1, wherein said first stage torque transfer and speed changing mechanism is a planetary gear assembly.

7. The multi-speed transfer case in accordance with claim 6, wherein said planetary gear assembly includes a planetary sun gear coaxial with and rotatable with said input shaft, a plurality of planet gears meshing with said sun gear, a planetary gear carrier for rotatably supporting said plurality of planet gears and a planetary ring gear meshing with said plurality of planet gears, said planetary gear carrier and said ring gear are coaxial with said input shaft and rotatable relative thereto and said planetary gear carrier includes a plurality of pins which rotatably support said plurality of planet gears and an axially extending sleeve which is coaxial with said input shaft and surrounds at least a portion of said input shaft, said sleeve serving as an output member for said planetary gear assembly and as an input member for the second stage torque transfer and speed changing mechanism.

8. The multi-speed transfer case in accordance with claim 7, wherein said speed selector mechanism includes a first stage actuator mechanism for controlling said planetary gear assembly, said first stage actuator mechanism including a first shift collar for selectively engaging said planetary ring gear and thereby holding said planetary ring gear stationary and a second shift collar for selectively engaging said planetary gear carrier so said planetary ring gear, said planetary gear carrier and said input shaft rotate at the same speed.

9. The multi-speed transfer case in accordance with claim 8, wherein said first stage actuator mechanism provides a speed reduction when said first shift collar engages said planetary ring gear.

10. The multi-speed transfer case in accordance with claim 8, wherein said first stage actuator mechanism is so arranged that said ring gear and said planetary gear carrier are not simultaneously engaged by respective shift collars when said input shaft is rotated.

11. The multi-speed transfer case in accordance with claim 1, wherein said final stage torque transfer and speed changing mechanism includes a plurality of chain drive mechanisms in parallel, said chain drive mechanisms providing different output speeds for a given input speed and said speed selector mechanism includes a second stage actuator mechanism adapted to engage said chain drive mechanisms selectively so only one (1) of said chain drive mechanisms is in driving relationship.

12. The multi-speed transfer case in accordance with claim 11, wherein said final stage actuator mechanism includes an actually slidable third shift collar which is adapted to engage alternately a first chain drive assembly and a second chain drive assembly.

13. The multi-speed transfer case in accordance with claim 12, wherein each said first chain drive assembly and second chain drive assembly includes a drive sprocket, a driven sprocket and a chain linking said drive sprocket and said driven sprocket in driving relationship.

14. The multi-speed transfer case in accordance with claim 13, wherein said driven sprocket of said first chain drive assembly is of greater diameter than said drive sprocket of said first chain drive assembly, thereby providing speed reduction and said driven sprocket of said second chain drive assembly is of smaller diameter said than said drive sprocket of said second chain drive assembly, thereby providing overdrive.

15. The multi-speed transfer case in accordance with claim 1, wherein said first and second output shafts are coaxial.

16. The multi-speed transfer case in accordance with claim 1, including a differential for permitting said first and second output shafts to be driven simultaneously at different speeds.

17. The multi-speed transfer case in accordance with claim 16, wherein said differential includes a second planetary gear assembly for permitting said first and second output shafts to be driven at different speeds, said second planetary gear assembly including a second planetary ring gear coaxial and rotatable with said second output shaft, a second gear carrier coaxial with said first output shaft and rotatable therewith, a plurality of planet gears mounted on said second planetary gear carrier and meshing with said second planetary ring gear and a second sun gear coaxial with and rotatable with said first output shaft, said second sun gear being in meshing relationship with said plurality of planet gears.

18. The multi-speed transfer case in accordance with claim 16, wherein said first and second output shafts are coaxial.

19. The multi-speed transfer case in accordance with claim 18, wherein said second planetary ring gear and said second output shaft are integral.

20. The multi-speed transfer case in accordance with claim 16, wherein said second planetary ring gear and said second output shaft are integral.

* * * * *